（12） United States Patent
Wen et al.

(10) Patent No.: US 8,880,026 B2
(45) Date of Patent: Nov. 4, 2014

(54) METHOD AND APPARATUS FOR PROVIDING NETWORK SERVICES TO A MOBILE USER EQUIPMENT

(75) Inventors: Haibo Wen, Shanghai (CN); Fanxiang Bin, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 194 days.

(21) Appl. No.: 13/513,241

(22) PCT Filed: Dec. 22, 2009

(86) PCT No.: PCT/CN2009/075821
§ 371 (c)(1),
(2), (4) Date: Jun. 1, 2012

(87) PCT Pub. No.: WO2011/075884
PCT Pub. Date: Jun. 30, 2011

(65) Prior Publication Data
US 2012/0238247 A1    Sep. 20, 2012

(51) Int. Cl.
*H04M 1/66*    (2006.01)
*H04W 12/08*    (2009.01)
*H04W 84/04*    (2009.01)

(52) U.S. Cl.
CPC ............ *H04W 12/08* (2013.01); *H04W 84/045* (2013.01)
USPC ........ 455/410; 455/411; 455/450; 455/456.6; 455/433; 455/434

(58) Field of Classification Search
CPC ... H04W 12/08; H04W 84/045; H04W 60/04; H04W 4/00
USPC .............. 455/410, 411, 450, 456.6, 433, 434, 455/435.1
See application file for complete search history.

(56) References Cited

U.S. PATENT DOCUMENTS

2008/0305772 A1 *  12/2008  Balasubramanian et al. ... 455/411

FOREIGN PATENT DOCUMENTS

| CN | 101136826 A | * | 3/2008 | .............. H04L 12/28 |
| CN | 101316446 A |   | 12/2008 | |
| CN | 101340701 A |   | 1/2009 | |
| JP | 2009-290282 | * | 10/2009 | .............. H04W 8/26 |

OTHER PUBLICATIONS

International Search Report PCT/ISA/210.
Chinese Office Action dated Jul. 2, 2014 in corresponding Chinese Application No. 200980160776.7.

* cited by examiner

*Primary Examiner* — Manpreet Matharu
(74) *Attorney, Agent, or Firm* — Harness, Dickey & Pierce

(57) ABSTRACT

The present invention provides a method and apparatus of providing network services to a mobile user equipment, where the mobile user equipment is connected to a fixed access network via a Femtocell base station and thus connected to the mobile core network. The mobile core network provides an access token to a Femtocell base station. The Femtocell requests the fixed access network with the access token to perform network resource configuration for the mobile user equipment. The mobile user equipment establishes a network service connection based on the network resource configuration. In this way, technically, it may be guaranteed that the mobile user equipment can be legal listened. Dependent on different service attributes of the mobile user equipment, different network access manners may be implemented, such that operators of mobile and fixed access networks may reasonably commercially apportion the charges based on their respective network resource occupation situations.

15 Claims, 4 Drawing Sheets

METHOD AND APPARATUS FOR PROVIDING NETWORK SERVICES TO A MOBILE USER EQUIPMENT

FIELD OF THE INVENTION

The present invention relates to the field of communication technology, and particularly relates to a method and apparatus for providing network services to a mobile user equipment based on the Femtocell technology.

DESCRIPTION OF THE RELATED ART

In the current wireless communication technologies, a macro cell-based communication will deteriorate the indoor service quality due to poor penetration of the radio frequency into buildings. Moreover, the burden on the wireless channel is increasingly tense. Further, study shows that more than 50% of the voice traffic and more than 70% of the data traffic of wireless communication come from indoors.

Therefore, the study on the fixed and mobile convergence network based on Femtocell and other similar technologies has become a hot spot in the industry. Some Femtocell base stations for household and small business applications provide Internet service access to a mobile user equipment (UE) through an existing fixed access network (such as DSL or cable TV high-speed network). Its access manners have two kinds: (1) the traffic data flow is back hauled to the mobile core network via the IP security tunnel between the Femtocell and its dedicated gateway FGW, and then accessed to the Internet; (2) some specific traffic data flow of the UE is directly bypassed from Femtocell and accessed to the Internet via a fixed access network. Hereinafter, further illustration will be made with reference to FIGS. 1 and 2.

FIG. 1 is a typical structural example of a system for providing network service based on Femtocell base station—a backhaul access manner, where UE, on one hand, may access the mobile core network via a UMTS terrestrial radio access network UTRAN that includes a wireless base station (NodeB) and a radio network controller (RNC), thus implementing a connection for a user terminal for example, a mobile phone, a portable computer, to the mobile core network. While the UE mobiles into the coverage of a Femtocell base station in its home network, it may implement a connection to the mobile core network via FGW in a manner of IP security tunnel through a broadband connection provided by a fixed access network, thereby realizing the Internet access via the mobile core network.

However, this solution has the following drawbacks: with considerable amount of deployment of these Femtocell base stations, because all traffic data of the UE are back hauled to the mobile core network via the IP security tunnel and the FGW, for the mobile operator, although the traffic data flow is offloaded from a macro cell wireless access, it fails to be successfully offloaded from the mobile core network. And with the increase of mobile users' demands on high-speed data services (for example, IPTV, HSI, etc.), the incurred amount of data flow is troublesome to the mobile core network. With HNG as an example, as a portal that bridges the Femtocell and the mobile core network, it needs to process a considerable amount of encryption tunnels and manage handover for uses to enter into/exit from the Femtocell. While for network operation of a fixed access network, the backhaul between Femtocell and FGW utilizes its broadband access connection, and particularly, with the increase of applications of high-speed data services by mobile users, the consumption on bandwidth resources also increases, but it does not benefit therefrom.

FIG. 2 is a typical structural example of a system for providing Internet service based on Femtocell base station—a local bypass solution, where when UE moves into a coverage of a Femtocell base station in its home network, it attaches and establishes a PDP (packet data protocol) context with the Femtocell, thereby obtaining a local private address assigned thereto, such that it may access other home appliances or implement Internet access through a fixed access network, thereby reducing the amount of data flow back hauled to the mobile core network via the IP security tunnel.

However, this solution has the following drawbacks: 1) since UE obtains the local private IP address of the Femtocell but is hidden behind the home gateway, how to legally listen to the UE hidden behind the home gateway? 2) the UE cannot enjoy the existing service policies and it is hard to be extensible so as to obtain differentiated services in the fixed access network; 3) it is not conducive to an open access solution, because the operator of a fixed access network generally charges specific services such as HSI by each DSL broadband connection, therefore, it cannot obtain the network resource information provided for the UE and further charge it.

SUMMARY OF THE INVENTION

The present invention intends to solve one or more of above technical problems. It provides a technical solution of providing network services to a mobile user equipment based on Femtocell technology, where a Femtocell base station establishes a resource configuration for a fixed access network for an attached mobile user equipment, and where the mobile user equipment may establish an IP connection with the resource configuration and implement a local bypass access through a fixed access network.

According to one embodiment of the present invention, there is provided a method of providing network services to a mobile user equipment, where the mobile user equipment is connected to a fixed access network via a Femtocell base station and thus connected to the mobile core network, the method comprising the following steps: a1) the mobile core network provides an access token to the Femtocell base station; b) requesting by the Femtocell base station the fixed access network with the access token to perform network resource configuration for the mobile user equipment; c) establishing by the mobile user equipment a network service connection based on the network resource configuration.

According to another aspect of the present invention, there is provided a communication apparatus in a mobile core network, comprising: receiving unit configured to receive a particular request message from a client, wherein the request message comprises recognizable information corresponding to a fixed access network; processing unit configured to request for an access token from an authentication server in the fixed access network based on the request message, wherein the access token may be used by the client to obtain a network resource configuration of the fixed access network; sending unit configured to provide the access token to the client.

According to a further aspect of the present invention, there is provided a Femtocell base station, comprising: obtaining unit configured to obtain for a mobile user equipment an access token for accessing a fixed access network; requesting unit configured to request for and configure a fixed access network resource for the mobile user equipment based on a context request of the mobile user equipment and the access token, and establish a corresponding network connection.

According to a still further aspect of the present invention, there is provided an authentication server in a fixed access network, comprising: allocating unit configured to allocate an access token for configuring a local network resource based on a request from a mobile core network; authenticating unit configured to receive a request from a client in a local network and authenticate the access token carried thereby, and perform network resource allocation for the client.

The present invention has the following technical advantages:

Because the mobile user equipment uses a network resource allocated by the fixed access network, for example, using its IP address as its PDP address, to perform network access, this mobile use equipment is visible to the fixed network operator, which may technically guarantee an effective and legal listening to bypassed traffic. On the other hand, different access manners are implemented based on different service attributes of the mobile user, wherein the services accessed in a local bypass manner may obtain a service quality warranty through a corresponding technical means in the fixed access network. Further, the operator of the fixed access network may implement a commercial charge apportionment with the operator of the mobile core network based on the resource allocated for the mobile user equipment and its occupation (allocation and release) condition.

BRIEF DESCRIPTION OF THE DRAWINGS

Features, properties, and advantages of the present invention will become more apparent through the following detailed description with reference to the accompanying drawings. Like elements in the accompanying drawings have the same identifications, wherein.

DETAILED DESCRIPTION OF THE INVENTION

Hereinafter, the preferred embodiments of the present invention will be described in detail with reference to the accompanying drawings.

Figure 1:
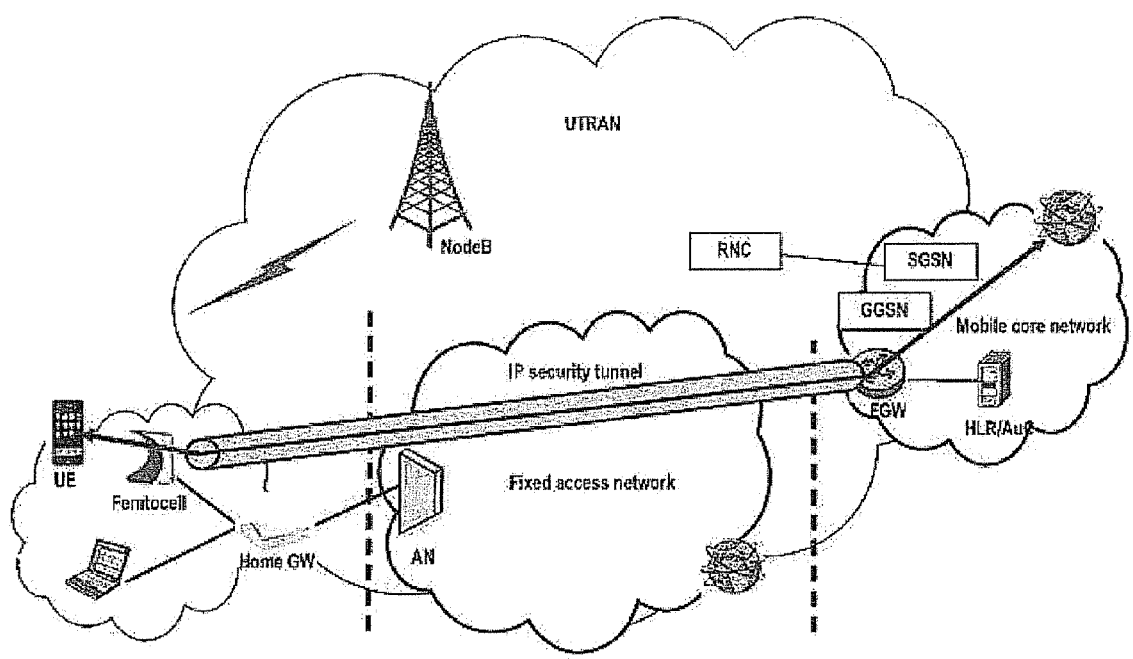
FIG. 1 is a structural example 1 of a system for providing network service based on a Femtocell base station (prior art)
Figure 2:
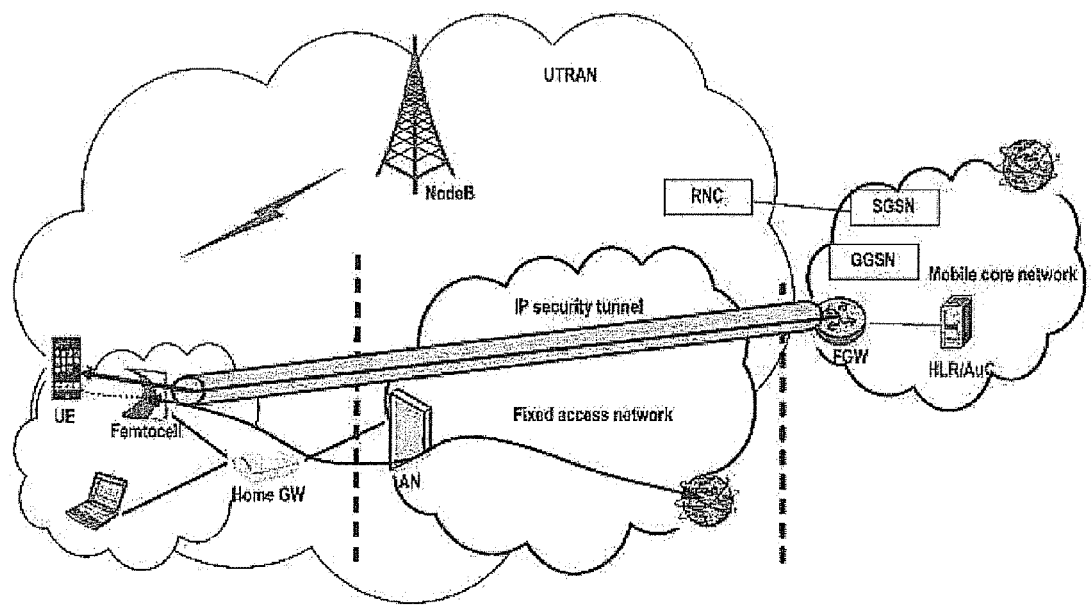
FIG. 2 is a structural example 2 of a system for providing network service based on a Femtocell base station (prior art)
Figure 3:
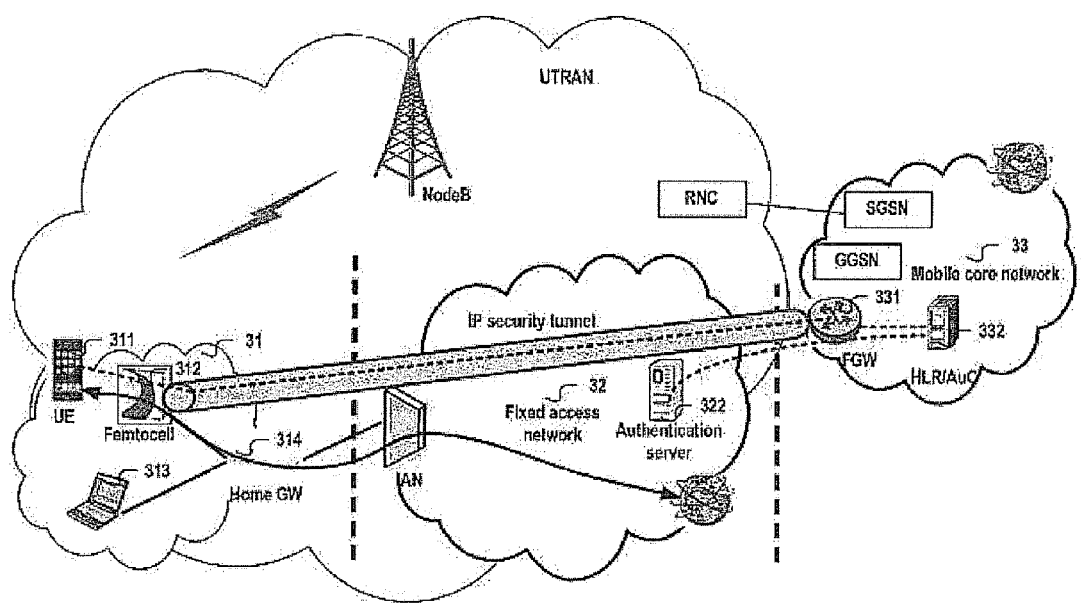
FIG. 3 is a structural embodiment of a system for providing network service based on a Femtocell base station according to the present invention.
Figure 4:
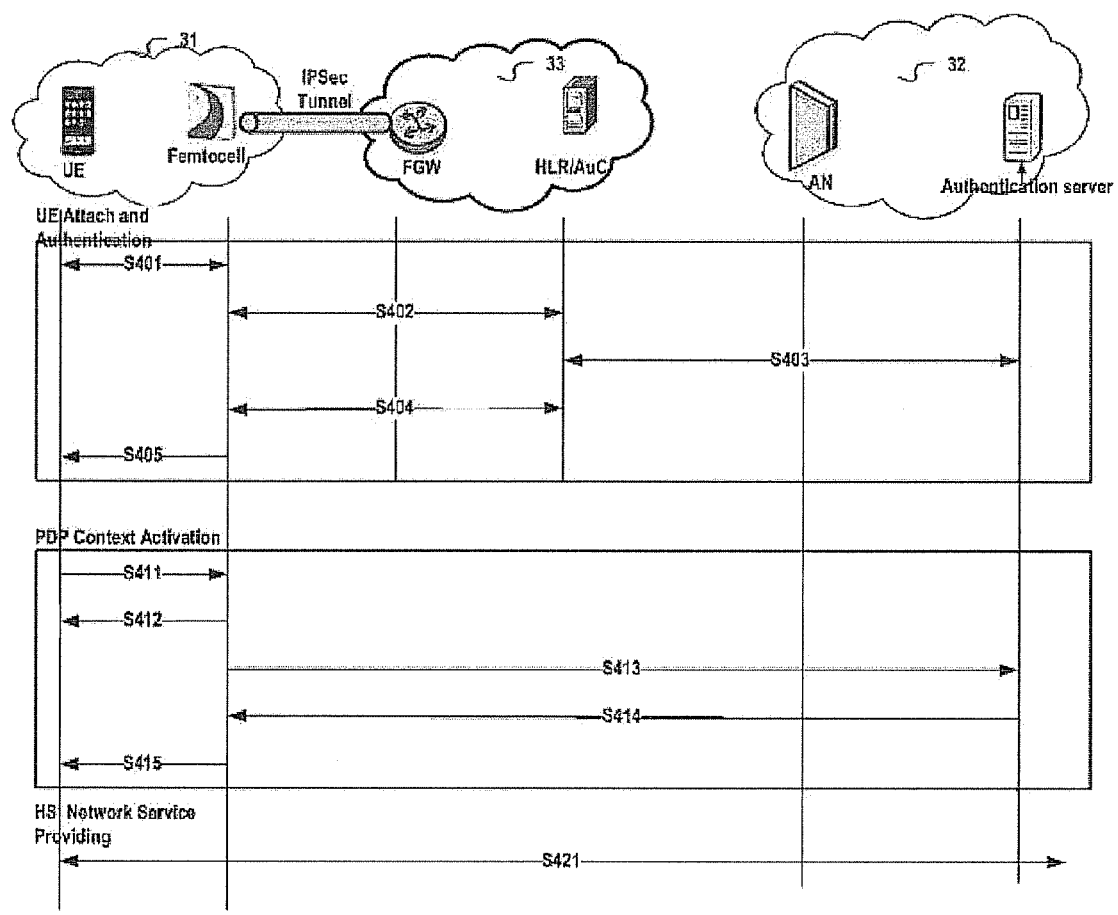
FIG. 4 is a flow embodiment of a method for providing network service based on a Femtocell base station according to the present invention.

According to the diagram of network structure of the invention as illustrated in FIG. 3, it comprises a user network 31, a fixed access network 32 and a mobile core network 33, where a mobile user equipment UE 311 in the user network 31 is suitable for various standards such as CDMA (code-divisional multiple access), GSM (global system for mobile communications), UMTS (universal mobile telecommunication system) and supports 2G, 2.5G, and 3G; in the same system and at the same frequency band with other mobile base stations of the operator, the UE 311 may implement a connection to the mobile core network 33 via a macro-cell UTRAN (UMTS terrestrial radio access network) as well as implementing a connection to the mobile core network 33 in a manner of IP security tunnel between the Femtocell 312 and the FGW 331. Besides the function of providing a security gateway and establishing a security tunnel between Femtocell and FGW, it actually plays a role of a virtual RNC, converges the traffic of all Femtocells controlled thereunder, and presents a standard interface function to the traditional mobile core network 33. Femtocell 312 implements a local GGSN (gateway GPRS support node) function and local SGSN (serving GPRS support node) function (of course, in other scenario, a non-access layer signaling proxy NAS proxy is implemented at the Femtocell, and SGSN function is processed in the mobile core network), such that the local service is bypassed and directly performs service access via the fixed access network 32.

According to one embodiment of the present invention, a mobile user equipment UE 311, when moving into the coverage of the Femtocell 312 in its home network and attempting to be attached to the Femtocell, may perform operations such as user authentication and location update through the previously mentioned IP security tunnel, and the Femtocell may carry in its uplink request message its relevant network parameter information in the fixed access network, for example, its IP address in the fixed access network 32, etc. Relevant network element apparatus in the mobile core network 33, for example, HLR/AuC (home location register/authentication center) may perform authentication on the user identity of the UE 311, service registration, and mobility management, etc., through the previously mentioned operation example. In combination with the fixed access network information provided by the Femtocell, it may further request for an access token from the fixed access network 32 corresponding to the Femtocell and sends it to UE 311 in a particular manner through the previously mentioned IP security tunnel. Then, the Femtocell 312 may obtain the access token therein. The Femtocell 312 requests the authentication server 322 in the fixed access network 32 with the access token to perform local network resource configuration for the UE. In this way, the UE may obtain an IP address in the fixed access network as its PDP (packet data protocol) address to directly access to the Internet via the fixed access network 32, thereby realizing the local bypass access manner.

Because UE 311 uses the IP address allocated by the fixed access network 32 as its PDP address, the UE 311 is visible to the fixed access network operator, which may technically guarantee implementation of legal listening. On the other hand, dependent on different service attributes, Femtocell may set a priority instruction, such that the service quality may be guaranteed to a certain extent in the fixed access network. On the contrary, the data flow for the service data via the IP security tunnel during the process of being transmitted in the fixed network cannot obtain corresponding service quality guarantee. Further, the operator of the fixed access network 32 may implement commercial fee apportionment with the operator of the mobile core network 33 based on the resource allocated thereby for the UE 311 and the occupation condition, for example, IP address leasing time, network bandwidth, guarantee of service type Hereinafter, the Femtocell 312, HLR/AuC server 332, and authentication server 322 according to the present invention will be further described, respectively.

As a NodeB, Femtocell 312 provides a standard air interface for the mobile user equipment UE 311. In specific implementation, it may be a separate device or integrated with the home gateway (Home GW). In terms of functions, it may further comprise a RNC (signaling, radio resource management, user plane mobility, among other functions), GGSN (GGSN's session management, charging interface, among other functions), and SGSN-related functions (SGSN's authentication, session management, charging, signaling, user plane mobility, among other functions), etc.

According to an embodiment of Femtocell according to the present invention, the Femtocell 312 implements the local SGSN function. When receiving the request for attachment from the UE, it requires the UE to provide its identity information and requests user authentication to the mobile core network 33 via the established IP security tunnel. In the case of successful authentication, it will further perform a location update operation. Femtocell 312 may attach to an uplink relevant user authentication or location update message the network parameter information of its own device in the fixed access network 32, for example, its own IP address in the fixed access network 32. In this way, relevant apparatus in the mobile core network 33 may cross the domain to access the authentication server in a corresponding fixed access network 32 and obtain an access token allocated to the UE. Afterwards, Femtocell 312 will establish a MM Context (mobility management context) based on the UE-related information obtained from the mobile core network 33. Besides the IMSI (international mobile subscriber identification number) and the service as applied for, the relevant information further comprises an access token for the UE to access the fixed access network 32, such that when the UE establishes an IP connection and requests for a particular service, the Femtocell 312 will determine a specific access manner (local bypass or IP security tunnel connection) based on the activated PDP context of the UE and the previously mentioned MM Context. If the local bypass manner is adopted, it will provide the access toke to the local fixed access network 32 and requests for the UE the fixed access network resource and the configuration information, so as to obtain for the UE the IP address in the fixed access network 32. Thereby, the particular service requested by the UE will not be back hauled to the mobile core network through the IP security tunnel, but directly bypassed locally at the Femtocell.

Here, when NAS proxy is implemented at Femtocell, the access token may be obtained through a downlink Attach Accept message of the mobile core network 33, and then the Femtocell determines a specific external data network or mobile service to which it intends to link based on the APN provided by the UE. If the local bypass manner is adopted, it will provide the access token to the local fixed access network 32 and requests for the UE the fixed access network resource and configuration information.

Regarding HLR/AuC server 332, HLR is a core database for mobile user management in a mobile core network system, which stores user data of all mobile users in the HLR controlled area, for example, user-related parameters, and information regarding the current locations of the users. Authentication center (AuC) is an apparatus that is generally located in the HLR of a mobile core network system, to authenticate each mobile user equipment (through its SIM card) that attempts to connect to the network (generally when the phone is open), which is a functional entity that authenticates the identity of the mobile user and generates corresponding authentication parameters. Once the authentication is successful, the HLR is allowed to manage this SIM and above service.

According to another embodiment of AuC of the present invention, when the mobile user equipment UE 311 performs authentication at the attached Femtocell 312, it provides an authentication request message to the mobile core network 33 side, and the Femtocell 312 further attaches in the message the network parameter information of its own device in the fixed access network 32, for example, its IP address in the fixed access network 32. When receiving the authentication request message from the mobile user equipment, the AuC may check whether the message carries the network parameter information of the Femtocell in the fixed access network (for example, its IP address in the fixed access network 32, etc.), and it may further determine the service attribute subscribed thereby (for example, HSI service in a local bypass access manner). Afterwards, AuC requests the fixed access network where Femtocell is located to allocate an access token for accessing the fixed access network for the UE. AuC 332 may employ a standard Radius/Diameter protocol to interact with the authentication server in the fixed access network 32. AuC 332 provides the IP address of the Femtocell in the fixed access network 32 to the authentication server and obtains the access token. AuC 332 further provides the access token to Femtocell directly or indirectly in a particular manner, for example, related authentication protocol response message, or management of the user data stored by local SGSN in the Femtocell in an Insert Subscriber Data manner through the HLR, where the relevant information includes one previously mentioned access token.

According to another embodiment of HLR of the present invention, when a mobile user equipment UE 311 performs location update operation at the attached Femtocell 312, it provides a location update request message to the mobile core network 33 side, and the Femtocell 312 further attaches in the message the network parameter information of its own device in the fixed access network 32, for example, its IP address in the fixed access network 32. After receiving the location update request message, besides conventional operations of updating SGSN location, sending out a cancelling Location signaling to notify the old SGSN of deleting relevant settings of UE, it checks whether the message carries the network parameter information of the Femtocell in the fixed access network (for example, its IP address in the fixed access network 32) and further requests the fixed access network 32 where the Femtocell is located to allocate for the UE an access token that is used for accessing the fixed access network. Further, the HLR 332 may provide the access token to the Femtocell directly or indirectly in a particular manner, for example, it feeds back the UE-related information to the management of the user data stored by local SGSN in the Femtocell through an Insert Subscriber Data signaling, where the relevant information includes one previously mentioned access token.

Here, when the NAS proxy is implemented at Femtocell, all of the SGSN functions are processed in the mobile core network. When the AuC/BLR performs authentication or location update operations, after it requests the fixed access network 32 to allocate for the UE an access token that is used for accessing the fixed access network, it sends the access token to a client SGSN via an Insert Subscriber Data signaling, where the SGSN further forwards the access token to the UE via an Attach Accept message. The NAS proxy in the Femtocell intercepts the access token in the Attach Accept message.

The authentication server 322 is generally used to authenticate whether a client in the network has rights to access and provide network resources such as IP address to the authenticated user. Here, the authentication server will allocate for the designated client apparatus an access token that is used for configuring the local network resource based on a request from the mobile core network. When the client apparatus provides the access toke to the authentication server in the fixed access network, the authentication server checks the access token and performs network resource configuration to the client apparatus.

According to an embodiment of an AAA authentication server of the present invention, it will assign an access token for its mobile user equipment UE 311 to access the fixed access network 32 for the client Femtocell in the assigned local fixed access network 32 with respect to the request message from a relevant network element apparatus of the mobile core network 33. Afterwards, when the AAA server receives the resource request from the Femtocell, it authenticates the access token in the request message and assigns thereto an IP address and relevant network parameter configuration in the fixed access network. Specifically, the AAA server receives the Access-Request protocol packet generated at the client Femtocell, where the protocol packet may include the Femtocell IP address, access token, etc. The AAA server authenticates the user. In the case of successful authentication, the AAA server sends the Access-Accept protocol packet to the client Femtocell. Otherwise, it sends an Access-Reject protocol packet. The Access-Accept packet includes network resource configuration such as the newly assigned IP address and relevant network parameters. In this way, after the client Femtocell receives the protocol packet, it may utilize the network resource configuration therein to establish a local bypass network service for the mobile user equipment UE 311.

Hereinafter, further description will be made to the method flow example of providing an HSI network service based on the Femtocell base station according to the present invention.

1. UE Attach and Authentication

At step S401, when the mobile user equipment UE moves into the coverage of Femtocell (unless otherwise indicated, the Femtocell here implements the function of local SGSN) in its home network 31, the UE first sends an Attach request to the Femtocell, then the Femtocell requires the UE to provide IMSI through an Identity Request.

At step S402, Femtocell sends out a user authentication request and an Update Location request to update the SGSN location of the UE as recorded in HLR. The Femtocell may further attach in the above mentioned request message the corresponding fixed access network 32 information. For example, Femtocell attaches the IP address and other information in the fixed access network 32 to the uplink request message.

At step S403, relevant network element apparatus (HLR/AuC) in the mobile core network 33 retrieves from the authentication server in the fixed access network 32 the access token for the UE to obtain the resource configuration of the fixed access network 32 so as to perform network access.

According to one embodiment, after the AuC in the mobile core network 33 receives the user authentication request message from the user side, it may further request an access token to the authentication server in the corresponding fixed access network 32 by parsing the fixed access network information as set by Femtocell in the request message, where the access token is for the UE to obtain the resource configuration of the fixed access network 32 so as to perform network access.

According to another embodiment, after the HLR in the mobile core network 33 receives the user location update message, it may further request an access token to the authentication server in the fixed access network 32 by parsing the fixed access network information as set by Femtocell in the request message, where the access token is for the UE to obtain the resource configuration of the fixed access network 32 so as to perform network access.

The AuC and HLR in the above embodiments may use a standard Radius/Diameter protocol to interact with the authentication server in the fixed access network 32, and the AuC and HLR provide to the authentication server the IP address of Femtocell in the fixed access network 32 so as to obtain the access token.

At step S404, after obtaining the access token, the AuC/HLR may feed back the UE-related information to Femtocell through the Insert Subscriber Data signaling, such that the Femtocell establishes an MM Context based thereupon. After establishing the UE's MM Context, the Femtocell returns an Insert Subscriber Data ACK information to AuC/HLR for confirmation. Here, the UE's relevant information further comprises the above mentioned access token besides IMSI, the service as applied for, among other information.

At step S405, the Femtocell agrees with the success of registration and returns an Attach Accept message to the UE. After the Attach is completed, the UE may start establishing a data service connection in the PS field to use the mobile data service, and meanwhile, starts executing the GMM mobile management procedure in the PS field.

It should be noted that if the Femtocell has no local SGSN function, it may intercept the Attach Accept message from the corresponding SGSN in the mobile core network by implementing NAS proxy, and the assigned access token is carried in the message.

2. Starting the Process of Activating the PDP Context

At step S411, the establishment of the connection between the UE and the Femtocell, as well as the transmission of data packets, is performed through the PDP context request. The UE first sends a request for activating the PDP context to open a new PDP context request to the Femtocell, the request message comprising: PDP Type, PDP Address, APN, QoS Requested, and other parameter information, wherein the PDP Type parameter is used for indicating that the IP model of the data connection is IPv4 or IPv6; the PDP address parameter may be used to indicate the configuration manner of the IP address, when there is no setting, it indicates that the IP address will be dynamically assigned by the network, otherwise, it is a static assignment manner.

According to one embodiment of the present invention, the Femtocell may assign a particular external data network or mobile service intended to be linked via the APN provided by UE, for example, by using 'HSI' APN, the Femtocell local bypass service may be used. The SGSN Proxy is implemented on the Femtocell so as to identify therewith in the NAS signaling the APN related to activating the bypass service. Here, illustration will be made with the HSI service as an example, which may also be extended to for example IPTV, etc.

At step S412, the Radio Access Bearer is established. Different telecommunication services and bearer services require different radio bearers. The UE initiates a request for establishing the Radio Access Bearer.

At step S413, Femtocell performs mobile domain check. Based on the previously mentioned MM Context, if Femtocell determines that the mobile user equipment UE or the requested service may be bypassed locally, it will request the network resource of the fixed access network 32 for the UE. Specifically, it sends an Access Request packet in a RADIUS protocol manner to the authentication server in the fixed access network 32, where the Access Request packet includes: access token, IP address of Femtocell, among other information. The AN (access node) at the network side may further insert the port information in the Access Request packet so as to provide accurate access location information to the Authentication Server.

At step S414, after the authentication server in the fixed access network 32 receives the Access Request packet, it checks the access token carried therewith and the access location port information, etc., to cross-check with the user information in the authentication server. After the authentication passes, it sends an Access Accept packet to its client Femtocell, where the packet includes: determining to assign the IP address.

It should be noted that in previous steps 413 and 414, the Femtocell performs the fixed access network resource request for the mobile user equipment UE and the response process may also be performed by utilizing the DHCP protocol.

At step S415, finally, the Femtocell replies to the UE with a PDP context activation message, where the message includes parameters such as PDP Type, PDP Address, QoS Negotiated, etc., wherein the PDP Address is the configured IP address in the fixed access network 32. After that, the UE goes into the PDP activation state.

3. Providing an HSI Network Service.

At step S421, after UE enters into the PDP activation state, it may access the service or external network resource through the fixed access network 32. In this way, when UE may be directly bypassed to the fixed access network at the Femtocell, the UE is visible to the fixed access network with respect to the IP level. The network operator may perform legal listening thereto or the HSI service provided by the fixed access network can be accessed. Further, the service quality delivered at the fixed access network may be differentiated and guaranteed.

Although some embodiments have been provided above to illustrate the present invention, they are not used to limit the protection scope of the present invention. Those skilled in the art may perform various modifications on the embodiments without departing from the scope and spirit of the present invention. All such modifications fall within the scope of the present invention.

What is claimed is:

1. A method of providing network services to a mobile user equipment, the mobile user equipment being connected to a Femtocell base station, the Femtocell base station connected to a mobile core network via a backhaul tunnel and connected to a fixed access network, the fixed access network providing an Internet Protocol (IP) address to the Femtocell base station, the method comprising:
   providing, by the mobile core network, an access token to the Femtocell base station, the access token generated by the fixed access network and provided to the Femtocell base station by the mobile core network via the backhaul tunnel therebetween, the access token enabling the mobile user equipment to obtain access to the fixed access network;
   requesting, by the Femtocell base station, the fixed access network to perform network resource configuration for the mobile user equipment using the access token; and
   establishing, by the mobile user equipment, a network service connection to the fixed access network based on the network resource configuration such that the mobile user equipment is visible to the fixed access network.

2. The method according to claim 1, wherein
   the providing includes requesting, by the mobile core network, the access token from the fixed access network based on a request message from user side, and
   the request message includes identifiable information corresponding to the fixed access network.

3. The method according to claim 2, wherein the requesting is performed after receiving an authentication request message from the mobile user equipment.

4. The method according to claim 2, wherein the requesting is performed after receiving a location update request message from the mobile user equipment.

5. The method according to claim 2, wherein
   the Femtocell implements a local SGSN function, and
   the providing includes sending the access token from the mobile core network to the Femtocell in a manner of inserting into user data.

6. The method according to claim 1, wherein the network resource configuration includes an IP address assignment and relevant network parameter configuration, and
   the mobile user equipment is configured to use the IP address assignment as its Packet Data Protocol (PDP) address to directly access the internet via the fixed access network.

7. A communication apparatus in a mobile core network, the communication apparatus connected to a femocell base station via a backhaul tunnel, the femocell base station connected to a fixed access network, comprising:
   a processor configured to,
      receive a request message from a mobile user equipment via the Femtocell base station, the request message including identifiable information corresponding to the fixed access network, the identifiable information including an Internet Protocol (IP) address of the Femtocell base station in the fixed access network,
      request an access token from an authentication server in the fixed access network based on the request message, the access token enabling the mobile user equipment to obtain a network resource configuration of the fixed access network to access the fixed access network such that the mobile user equipment is visible to the fixed access network, and
      send the access token to the mobile user equipment.

8. The communication apparatus according to claim 7, wherein the request message is a user authentication request message or a user location update request message.

9. The communication apparatus according to claim 7, wherein the processor inserts the access token into user data.

10. The communication apparatus according to claim 7, wherein the communication apparatus is a mobile authentication center (AuC) or a home location register (HLR).

11. A Femtocell base station, comprising:
    a processor configured to:
       obtain for a mobile user equipment an access token for accessing a fixed access network, the access token generated by the fixed access network and provided to the Femtocell base station by a mobile core network via a backhaul tunnel therebetween, the access token enabling the mobile user equipment to obtain access to the fixed access network such that the mobile user equipment is visible to the fixed access network,
       configure a fixed access network resource based on a context request from the mobile user equipment and the access token, and
       establish a corresponding network connection between the mobile user equipment and the fixed access network via the Femtocell base station such that the mobile user equipment is visible to the fixed access network.

12. The Femtocell base station according to claim 11, wherein the processor is configured to set an IP address in the fixed access network on an uplink request message of the mobile user equipment.

13. The Femtocell base station according to claim 11, wherein the processor is configured to obtain the access token from the mobile core network when the mobile user equipment performs a user authentication request.

14. The Femtocell base station according to claim 11, wherein the processor is configured to obtain the access token from the mobile core network when the mobile user equipment performs a location update request.

15. An authentication server in a fixed access network, the authentication server configured to connect to a femtocell base station the femtocell base station configured to connect to a mobile core network via a backhaul tunnel, comprising:
    a processor configured to,
        assign an access token for configuring a local network resource based on a request from the mobile core network and provide the access token to the Femtocell base station via the backhaul tunnel, the access token enabling mobile user equipment to obtain access to the fixed access network such that the mobile user equipment is visible to the fixed access network;
        receive a request from a mobile user equipment in a local network,
        authenticate a carried access token, and
        configure network resources for the mobile user equipment such that the mobile user equipment is visible to the fixed access network.

\* \* \* \* \*